United States Patent Office.

THOMAS HULL AND ALEXANDER H. VAIL, OF POUGHKEEPSIE, NEW YORK, ASSIGNORS TO THEMSELVES AND E. WRIGHT VAIL, OF NEW YORK CITY.

Letters Patent No. 74,366, dated February 11, 1868.

IMPROVED LUBRICATING-COMPOUND.

The Schedule referred to in these Letters Patent and making part of the same.

TO ALL WHOM IT MAY CONCERN:

Be it known that we, THOMAS HULL and ALEXANDER H. VAIL, both of Poughkeepsie, in the county of Dutchess, and State of New York, have invented or discovered a new and useful Improvement in Lubricating-Compound, of which the following is a full, clear, and exact description.

The object of this our invention is the production of an efficient lubricator, having all the wearing or anti-friction qualities of oil, without that waste which is consequent upon the latter through its tendency to leak or run away from the surfaces it is used to lubricate, and which waste is most prominently conspicuous in the case of slow bearings or motions, to which our invention is mainly applicable. A further object of the invention is also to avoid the formation of gum in or about the bearing, and thus keep the running parts in perfect working order.

To secure these desiderata, our invention consists, firstly, in the use, in connection with suitable oily matter or materials, of white clay, to give body to the compound, and keep the various ingredients together or in place; and furthermore, the invention consists in an admixture of paraffine, petroleum-tar, and plumbago with white clay, as aforesaid, and whereby a lubricating-compound is produced, having the peculiar properties sought to be obtained, as previously specified.

While the proportions of the several ingredients forming such compound may be more or less changed, and different oily matter or materials substituted for use in connection with white clay, the following formula will be found very successful, and will suffice to show how this our invention may be put in practice: Thus, take, say, ten pounds (10) of petroleum-tar, two pounds (2) of paraffine, one pound (1) of white clay, and two ounces (2 oz.) of plumbago, all of which should be well mixed in any suitable manner, or by any appropriate means.

A lubricating-compound thus formed will possess all the essential qualities of oil, without that waste which is incidental to the latter in running away from the bearing, and which makes oil altogether unsuitable for slow bearings, the use of white clay, in the present instance, being an important element in the compound, as regards preventing escape or waste; also, such compound, moreover, being free from "gumming," and securing to the axle or other working part to which it may be applied greater freedom of run, or preserving it in better order than mere grease could do, and, in doing more service, proving very economical. Such a compound, which we propose to term "Oiline," may, among other purposes, be very advantageously employed in lubricating stage, truck, and wagon-axles.

What we here claim, and desire to secure by Letters Patent, is—

1. The use of white clay with oily matter or materials, to form a lubricating-compound, substantially as specified.

2. The combination with white clay, to produce a lubricating-compound, of petroleum-tar, paraffine, and plumbago, essentially as herein set forth.

In testimony whereof, we hereunto set our hands, in the presence of two subscribing witnesses, this 31st day of December, 1867.

THOMAS HULL,
ALEX. H. VAIL.

Witnesses:
JOHN W. VINCENT,
D. A. T. GALE.